(12) United States Patent
Koizumi

(10) Patent No.: US 10,975,913 B2
(45) Date of Patent: Apr. 13, 2021

(54) BEARING DEVICE FOR VEHICLE WHEEL

(71) Applicant: NTN CORPORATION, Osaka (JP)

(72) Inventor: Souta Koizumi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/496,469

(22) PCT Filed: Mar. 23, 2018

(86) PCT No.: PCT/JP2018/011842
§ 371 (c)(1),
(2) Date: Sep. 23, 2019

(87) PCT Pub. No.: WO2018/174264
PCT Pub. Date: Sep. 27, 2018

(65) Prior Publication Data
US 2020/0032848 A1    Jan. 30, 2020

(30) Foreign Application Priority Data

Mar. 24, 2017   (JP) .............................. JP2017-060048

(51) Int. Cl.
*F16C 33/78* (2006.01)
*F16C 19/38* (2006.01)
*B60B 27/00* (2006.01)

(52) U.S. Cl.
CPC ...... *F16C 33/7823* (2013.01); *B60B 27/0073* (2013.01); *F16C 19/38* (2013.01); *F16C 2326/02* (2013.01)

(58) Field of Classification Search
CPC .... F16C 33/78; F16C 33/7823; F16C 33/783; F16C 33/7886; B60B 27/0073;
(Continued)

(56) References Cited

U.S. PATENT DOCUMENTS 9,090,122 B2 *   7/2015   Morita .................. F16C 33/805
2013/0241270 A1   9/2013   Morita
(Continued)

FOREIGN PATENT DOCUMENTS

CN      103210224     7/2013
JP      2012-097817   5/2012
(Continued)

OTHER PUBLICATIONS

International Search Report dated Jun. 12, 2018 in International (PCT) Application No. PCT/JP2018/011842.
(Continued)

*Primary Examiner* — James Pilkington
(74) *Attorney, Agent, or Firm* — Wenderoth, Lind & Ponack, L.L.P.

(57) ABSTRACT

A bearing device for a wheel is disclosed. The bearing device includes: an outer ring; a hub ring having at least one inner ring, and double rows of inner rolling surfaces on an outer periphery of the hub ring; double rows of balls in between respective rolling surfaces of the outer ring and the hub ring; and an outer seal member. The bearing device further includes: core metal having a circular cylinder section and a circular plate section at an opening of the outer ring; and a lip having an elastic body and being positioned on the circular plate section. An annular dam section having an elastic body and protruding further radially outward than an outer peripheral surface of the outer ring extends from the circular plate section, and an outer member-side eaves section has a circular cylindrical shape and protrudes axially so as to surround the outer ring.

4 Claims, 10 Drawing Sheets

(58) Field of Classification Search
CPC ....... B60B 2900/511; B60B 2900/5112; B60B 2900/5114
See application file for complete search history.

(56) References Cited

U.S. PATENT DOCUMENTS

2016/0290406 A1* 10/2016 Yano ................... B60B 27/001
2019/0299710 A1* 10/2019 Kobayashi ............ B60B 35/025

FOREIGN PATENT DOCUMENTS

| JP | 2012-131452 | 7/2012 |
| JP | 2015-132362 | 7/2015 |

OTHER PUBLICATIONS

First Office Action dated Aug. 12, 2020 in Chinese Patent Application No. 201880020909.X, with English Translation.

* cited by examiner

BEARING DEVICE FOR VEHICLE WHEEL

BACKGROUND OF THE INVENTION

1. Technical Field

The present invention relates to a bearing device for a wheel.

2. Description of the Related Art

A bearing device for a wheel that supports a wheel rotatable on a suspension device of, for example, an automobile is conventionally known. In the bearing device for a wheel, a hub ring that is an inner member connected to the wheel is rotatably supported with a rolling element. The bearing device for a wheel suffers from a shorter bearing lifetime due to rust formed by a leak of grease from an outer ring that is an outer member or entry of muddy water or the like or damage to the rolling element or a race of the inner member. To address such a problem, the bearing device for a wheel is provided with a seal member that prevents sealed-in grease from leaking out from a gap between the outer member and the inner member and also prevents muddy water or the like from entering from the outside.

As such a bearing device for a wheel, there are some bearing devices in which a plurality of seal lips are provided on the seal member or a tightening force of the seal lips is made larger to increase seal performance to prolong the bearing lifetime. Such a structure allows the bearing device for a wheel to suppress entry of muddy water or the like into the bearing device for a wheel, which in turn makes it possible to increase the lifetime. However, in the bearing device for a wheel, an increase in the number of seal lips or an increase in tightening force of the seal lips results in an increase in friction torque. To address such a problem, there is known a bearing device for a wheel that prevents muddy water or the like from entering the seal lip portion while suppressing an increase in friction torque to increase seal performance. For example, such a bearing device for a wheel is disclosed in JP-A 2012-97817.

In the bearing device for a wheel disclosed in JP 2012-97817, an outer-side seal member adjacent to the hub ring is provided with a dam section protruding radially outward relative to an outer peripheral surface of the outer ring. That is, the bearing device for a wheel is provided with an annular member protruding radially outward at an outer-side end of the outer ring adjacent to the hub ring. In the bearing device for a wheel, muddy water or the like flowing on the outer peripheral surface of the outer member is dammed up by the dam section. This allows the bearing device for a wheel to suppress entry of muddy water or the like from the outer-side seal member to increase seal performance.

SUMMARY OF THE INVENTION

1. Technical Problems

The bearing device for a wheel disclosed in JP 2012-97817 is configured to dam up muddy water or the like flowing on the outer peripheral surface of the outer ring with the dam section having a predetermined height. That is, the amount of water that can be dammed up by the dam section is determined by the height of the dam section. On the other hand, the height of the dam section is limited by a position of a hub bolt and the like. Therefore, depending on the shape of the bearing device for a bearing, there is a case where the dam section cannot have a height that is sufficient to increase the seal performance.

The present invention has been made in view of the above circumstances, and it is therefore an object of the present invention to provide a bearing device for a wheel that achieves an increase in effect of damming up muddy water or the like with a dam section.

2. Solutions to the Problems

That is, a bearing device for a wheel includes an outer member having double-row outer rolling surfaces integrally formed on an inner periphery, an inner member including a hub ring having a small-diameter stepped section axially extending on an outer periphery and at least one inner ring press-fitted on the small-diameter stepped section of the hub ring, the inner member having double-row inner rolling surfaces formed on an outer periphery facing the double-row outer rolling surfaces, double-row rolling elements rollably interposed between respective rolling surfaces of the outer member and the inner member, and a seal member configured to seal a space between the outer member and the inner member. In such a bearing device for a wheel, the seal member includes a core metal having a circular cylinder section provided in an opening of the outer member and a circular plate section extending radially inward from the circular cylinder section, and a lip formed of an elastic body provided on the circular plate section, and a dam section formed of an elastic body and having an annular shape is provided extending from the core metal, the dam section protruding radially outward relative to an outer peripheral surface of the outer member, and an outer member-side eaves section formed of an elastic body and having a cylindrical shape is provided integrally with the dam section, the outer member-side eaves section axially protruding to surround the outer member.

In the bearing device for a wheel, the core metal includes a flange section extending from the circular cylinder section radially outward relative to the outer peripheral surface of the outer member, and the dam section is provided on the flange section.

In the bearing device for a wheel, an outer peripheral surface of the dam section protrudes radially outward relative to an outer peripheral surface of the outer member-side eaves section.

In the bearing device for a wheel, an inner member-side eaves section having a cylindrical shape is provided axially protruding from the dam section to the vicinity of the hub ring.

In the bearing device for a wheel, on an outer peripheral surface of at least one of the dam section, the outer member-side eaves section, and the inner member-side eaves section, an annular groove is circumferentially formed.

3. Advantageous Effects of the Invention

The effects of the present invention are as follows.

According to the present invention, a space for receiving muddy water or the like is formed by the outer member-side eaves section along the outer peripheral surface of the outer member. This makes it possible to increase the effect of damming up muddy water or the like with the dam section.

According to the present invention, the dam section is provided on the flange section of the core metal, increasing the rigidity of the dam section and the outer member-side eaves section and allowing the dam section and the outer member-side eaves section to be formed of a thin member, which makes the space for receiving muddy water or the like large as compared with a structure where no core metal is provided. This makes it possible to increase the effect of damming up muddy water or the like with the dam section.

According to the present invention, the dam section protrudes from the eaves section, allowing muddy water to be dammed up by the dam section even when the muddy water overflows from the space for receiving muddy water or the like between the outer peripheral surface of the outer member and the outer member-side eaves section. This makes it possible to increase the effect of damming up muddy water or the like with the dam section.

According to the present invention, the lip portion is covered by the inner member-side eaves section, making muddy water or the like difficult to enter the lip portion. This makes it possible to increase the effect of damming up muddy water or the like with the dam section.

According to the present invention, the annular groove is formed on the outer peripheral surface, allowing muddy water to be guided downward through the groove even when the muddy water overflows from the space for receiving muddy water or the like between the outer peripheral surface of the outer member and the outer member-side eaves section. This makes it possible to increase the effect of damming up muddy water or the like with the dam section.

BRIEF DESCRIPTION OF THE DRAWINGS

FIG. 4A is a partially enlarged cross-sectional view showing a state where muddy water or the like is flowing into an annular space of the outer-side seal member, and FIG. 4B is a partially enlarged cross-sectional view showing a state where the annular space of the outer-side seal member has been filled with muddy water or the like.

FIG. 6A is a partially enlarged cross-sectional view showing a structure of the outer-side seal member, and FIG. 6B is a partially enlarged cross-sectional view showing a state where an annular space of the outer-side seal member has been similarly filled with muddy water or the like.

FIG. 7A is a partially enlarged cross-sectional view showing a structure of the outer-side seal member, and FIG. 7B is a partially enlarged cross-sectional view showing a state where an annular space of the outer-side seal member has been similarly filled with muddy water or the like.

FIG. 8A is a partially enlarged cross-sectional view showing a structure of the outer-side seal member, and FIG. 8B is a partially enlarged cross-sectional view showing a state where an annular space of the outer-side seal member has been similarly filled with muddy water or the like.

FIG. 10A is a cross-sectional view showing a state where the outer-side seal members are stacked on each other, and FIG. 10B is a partially enlarged cross-sectional view showing a state where the outer-side seal members are similarly stacked on each other.

DETAILED DESCRIPTION OF EMBODIMENTS OF THE INVENTION

A description will be given below of a bearing device for a vehicle wheel 1 corresponding to a first embodiment of a bearing device for a wheel according to the present invention with reference to FIGS. 1 to 3.

Figure 1:
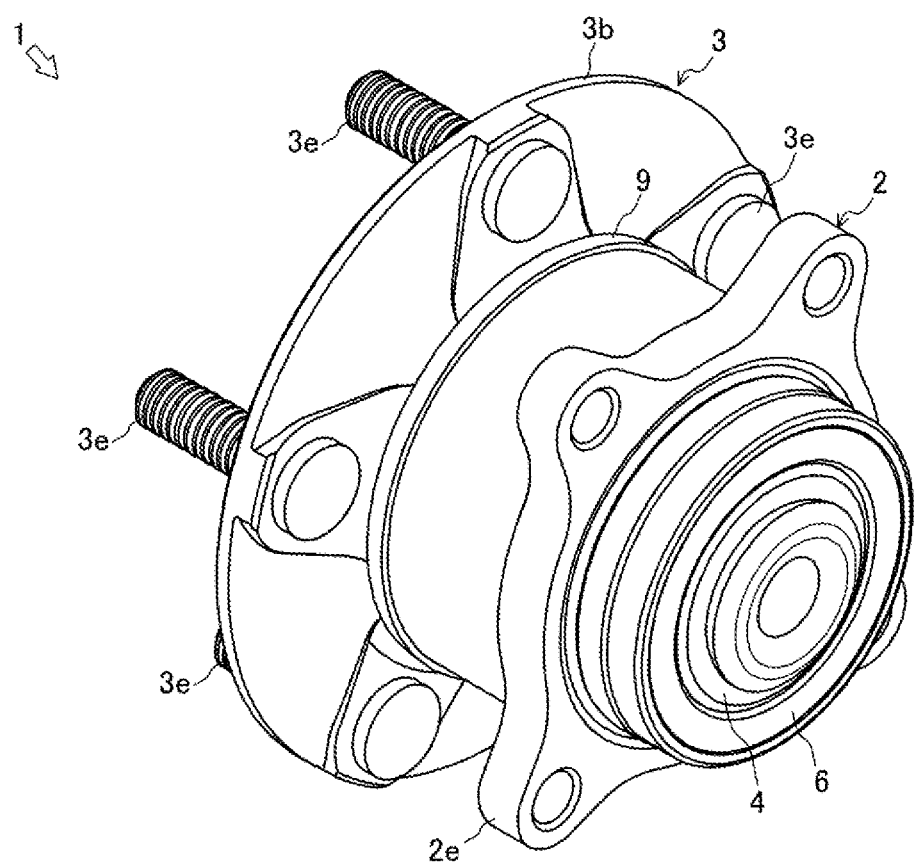
FIG. 1 is a perspective view showing an overall structure in each embodiment of a bearing device for a wheel according to the present invention.
Figure 2:
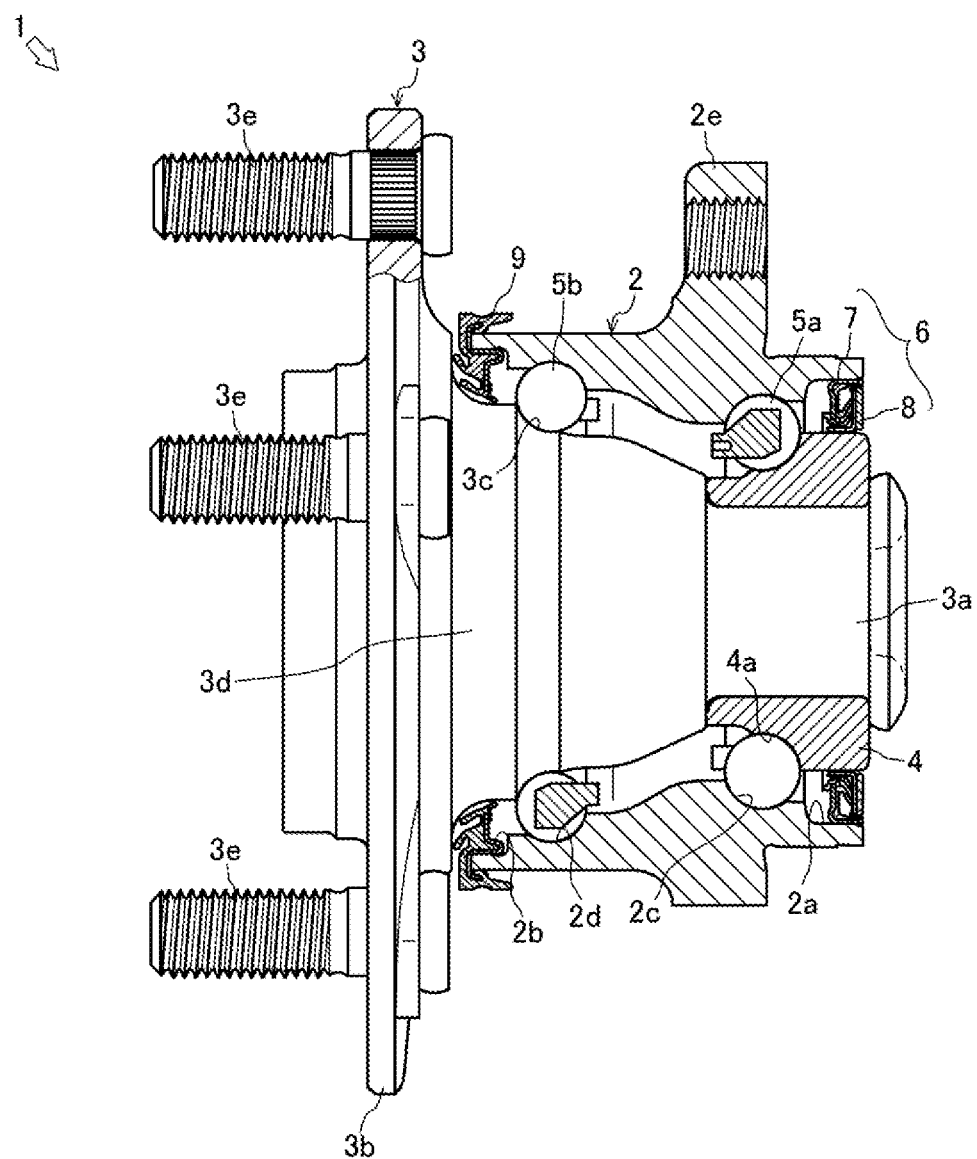
FIG. 2 is a cross-sectional view showing the overall structure in each embodiment of the bearing device for a wheel according to the present invention.

As shown in FIGS. 1 and 2, the bearing device for a vehicle wheel 1 supports a wheel rotatable on a suspension device of a vehicle such as an automobile. The bearing device for a vehicle wheel 1 includes an outer ring 2 that is an outer member, a hub ring 3 that is an inner member, an inner ring 4, two rows of inner-side balls 5a and outer-side balls 5b that are rolling rows, an inner-side seal member 6 that is a seal member, and an outer-side seal member 9 that is a seal member. Note that, herein, the inner side refers to a vehicle body side of the bearing device for a vehicle wheel 1 when installed on the vehicle body, and the outer side refers to a wheel side of the bearing device for a vehicle wheel 1 when installed on the vehicle body. An axial direction refers to a direction along a rotation axis of the bearing device for a vehicle wheel 1.

As shown in FIG. 2, the outer ring 2 is the outer member that supports the hub ring 3 and the inner ring 4. The outer ring 2 is formed in an approximately cylindrical shape. An inner-side opening 2a into which the inner-side seal member 6 can be fitted is formed at an inner-side end of the outer ring 2 disposed on the vehicle body side when the bearing device for a vehicle wheel 1 is installed on the vehicle. An outer-side opening 2b into which the outer-side seal member 9 can be fitted is formed at an outer-side end of the outer ring 2 disposed on the wheel side when the bearing device for a vehicle wheel 1 is installed on the vehicle.

On an inner peripheral surface of the outer ring 2, an inner-side outer rolling surface 2c and an outer-side outer rolling surface 2d having an annular shape are formed in parallel to each other in a circumferential direction. On an outer peripheral surface of the outer ring 2, a vehicle body installation flange 2e to be installed onto a knuckle of a suspension device (not shown) is integrally formed.

The hub ring 3, constituting the inner member, rotatably supports a vehicle wheel (not shown). The hub ring 3 is formed in a bottomed cylindrical shape. A small-diameter stepped section 3a having a reduced diameter is formed on an outer peripheral surface of an inner-side end of the hub ring 3 disposed on the vehicle body side when the bearing device for a vehicle wheel 1 is installed on the vehicle. A wheel installation flange 3b onto which a wheel is installed is integrally formed on an outer-side end of the hub ring 3 disposed on the wheel side when the bearing device for a vehicle wheel 1 is installed on the vehicle. The wheel installation flange 3b is provided with hub bolts 3e arranged at equal intervals in a circumferential direction. On the hub ring 3, an outer-side inner rolling surface 3c is formed facing the outer-side outer rolling surface 2d of the outer ring 2. Further, on the hub ring 3, a seal lip sliding surface 3d for the outer-side seal member 9 is formed on a base side of the wheel installation flange 3b. The hub ring 3 is provided with the inner ring 4 on the small-diameter stepped section 3a. On an inner periphery of the hub ring 3, serrations (or splines) for torque transmission are formed.

The inner ring 4 is formed in a cylindrical shape. On an outer peripheral surface of the inner ring 4, an annular inner rolling surface 4a is formed in the circumferential direction. The inner ring 4 is fixed to an inner-side end of the hub ring 3 by press-fitting. That is, on the inner side of the hub ring 3, the inner rolling surface 4a is formed by the inner ring 4. The inner rolling surface 4a of the inner ring 4 on the inner-side end of the hub ring 3 faces the inner-side outer rolling surface 2c of the outer ring 2, and the outer-side inner rolling surface 3c of the hub ring 3 faces the outer-side outer rolling surface 2d of the outer ring 2.

The row of inner-side balls 5a and the row of outer-side balls 5b that are rolling rows rotatably support the hub ring 3. In the row of inner-side balls 5a and the row of outer-side balls 5b, a plurality of balls as rolling elements are held in an annular shape by a cage. The row of inner-side balls 5a is rollably interposed between the inner rolling surface 4a of the inner ring 4 and the inner-side outer rolling surface 2c of the outer ring 2. The row of outer-side balls 5b is rollably interposed between the inner rolling surface 3c of the hub ring 3 and the outer-side outer rolling surface 2d of the outer ring 2. That is, the row of inner-side balls 5a and the row of outer-side balls 5b support the hub ring 3 and the inner ring 4 rotatably with respect to the outer ring 2.

In the bearing device for a vehicle wheel 1, the outer ring 2, the hub ring 3, the inner ring 4, the row of inner-side balls 5a, and the row of outer-side balls 5b constitute a double-row angular contact ball bearing. Note that, according to the present embodiment, the bearing device for a vehicle wheel 1 is provided with a double-row angular contact ball bearing, but is not limited to the double-row angular contact ball bearing and may be provided with a double-row tapered roller bearing or the like.

The inner-side seal member 6 closes a gap between the inner-side opening 2a of the outer ring 2 and the inner ring 4. The inner-side seal member 6 is formed of, for example, a pack seal with an encoder of a two side lip type that brings two seal lips into contact. The inner-side seal member 6 includes a seal plate 7 having an approximately cylindrical shape and a slinger 8 having an approximately cylindrical shape.

In the inner-side seal member 6, the seal plate 7 is fitted into the inner-side opening 2a of the outer ring 2, and the slinger 8 is fitted onto the inner ring 4, thereby constituting the pack seal. In the inner-side seal member 6, a seal lip on one side of the seal plate 7 is in contact with the slinger 8 through an oil film so as to be slidable with respect to the slinger 8. Accordingly, the inner-side seal member 6 prevents lubricating grease from leaking out from the outer ring 2 and foreign matter such as rainwater or dust from entering from the outside.

Figure 3:
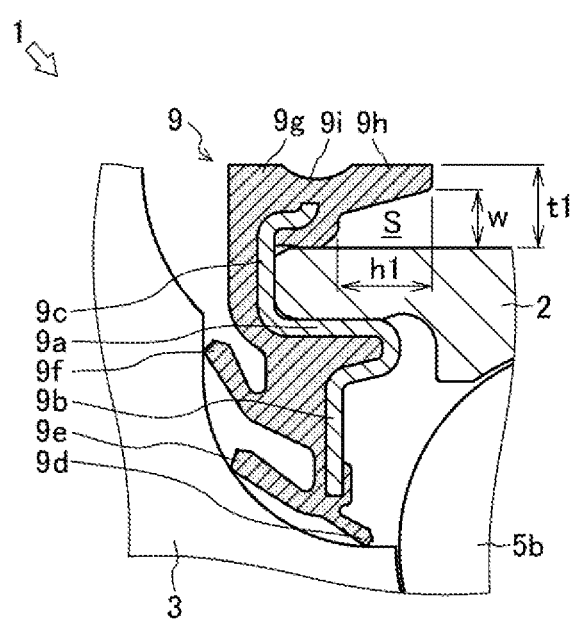
FIG. 3 is a partially enlarged cross-sectional view showing a structure of an outer-side seal member in a first embodiment of the bearing device for a wheel according to the present invention.

As shown in FIGS. 2 and 3, the outer-side seal member 9 closes a gap between the outer-side opening 2b of the outer ring 2 and the hub ring 3. The outer-side seal member 9 is formed of a plurality of seal lips and a core metal that is provided with the seal lips and has an approximately cylindrical shape.

The core metal is made of, for example, a ferritic stainless steel sheet (such as SUS430 based on the JIS standard), an austenitic stainless steel sheet (such as SUS304 based on the JIS standard), or a rust-proof cold rolled steel sheet (such as SPCC based on the JIS standard). The core metal is formed of an annular steel sheet that is bent by press molding to form a circular cylinder section 9a, a circular plate section 9b, and a flange section 9c. The circular cylinder section 9a is formed in a cylindrical shape that can be fitted into the outer-side opening 2b of the outer ring 2 that is the outer member. The circular plate section 9b is formed in an annular shape extending radially inward from the inner-side end of the circular cylinder section 9a. The flange section 9c is formed in an annular shape extending radially outward from the outer-side end of the circular cylinder section 9a. Further, an outer edge portion of the flange section 9c is bent toward the inner side with a predetermined gap provided with respect to the outer peripheral surface of the outer ring 2.

As shown in FIG. 3, a radial lip 9d, an inner axial lip 9e and an outer axial lip 9f each formed in an annular shape are integrally provided on a plate surface of the circular plate section 9b of the core metal by, for example, vulcanization bonding. A dam section 9g and an outer member-side eaves section 9h each formed in an annular shape are integrally provided on the outer edge of the flange section 9c of the core metal by, for example, vulcanization bonding. The radial lip 9d, the inner axial lip 9e, the outer axial lip 9f, the dam section 9g, and the outer member-side eaves section 9h are made of a synthetic rubber such as an acrylonitrile-butadiene rubber (NBR), a hydrogenated acrylonitrile-butadiene rubber (HNBR) excellent in heat resistance, an ethylene propylene rubber (EPDM), a polyacrylic rubber (ACM) excellent in heat resistance and chemical resistance, a fluororubber (FKM), or a silicone rubber.

The radial lip 9d is formed on a radially innermost side of the circular plate section 9b. The inner axial lip 9e and the outer axial lip 9f are formed on the outside (outer side) from the radial lip 9d and on a radially outer side from the radial lip 9d. The inner axial lip 9e and the outer axial lip 9f are arranged in the radial direction such that the inner axial lip 9e is disposed adjacent to the inner ring 4 and the outer axial lip 9f is disposed adjacent to the outer ring 2. That is, on the circular plate section 9b, the inner axial lip 9e is disposed on the radially inner side, and the outer axial lip 9f is disposed on the radially outer side.

In the outer-side seal member 9, the inner axial lip 9e and the outer axial lip 9f provided on the circular plate section 9b of the core metal face the outer side, and the circular cylinder section 9a of the core metal is provided on the outer-side end of the outer ring 2 that is the outer member. Specifically, in the outer-side seal member 9, the inner axial lip 9e and the outer axial lip 9f face the seal lip sliding surface 3d of the hub ring 3, and the circular cylinder section 9a is fitted into the outer-side opening 2b of the outer ring 2.

The radial lip 9d is in contact with or in close vicinity of the seal lip sliding surface 3d of the hub ring 3 through an oil film of grease serving as a lubricant to prevent grease in the bearing device for a vehicle wheel 1 from leaking to the outside. The inner axial lip 9e and the outer axial lip 9f are in contact with the seal lip sliding surface 3d of the hub ring 3 through an oil film of grease serving as a lubricant to prevent muddy water, dust, or the like from entering the bearing device for a vehicle wheel 1 from the outside. As described above, the radial lip 9d, the inner axial lip 9e, and the outer axial lip 9f are in contact with the seal lip sliding surface 3d through an oil film of grease to make the outer-side seal member 9 slidable. Accordingly, the outer-side seal member 9 ensures a good sliding state between the seal lip sliding surface 3d and each of the seal lips to prevent grease from leaking out from the outer-side opening 2b of the outer ring 2 and rainwater, dust, or the like from entering from the outside.

The dam section 9g is formed in an annular shape covering the bent outer edge portion of the flange section 9c of the core metal. The dam section 9g is formed with a radial length t1. Further, the dam section 9g is formed with an inner diameter smaller than an outer diameter of the outer ring 2. The outer member-side eaves section 9h is formed in a cylindrical shape that protrudes in the axial direction from an inner-side side surface of the dam section 9g and has any given axial length h1. The outer member-side eaves section 9h is formed identical in outer diameter to the dam section 9g. That is, the outer peripheral surface of the dam section 9g and the outer peripheral surface of the outer member-side eaves section 9h form the same cylindrical surface. The outer member-side eaves section 9h is formed with an inner diameter larger than the outer diameter of the outer ring 2 by a predetermined length 2w (a radius larger by a length w). That is, on the inner peripheral surface of the dam section 9g and the inner peripheral surface of the outer member-side eaves section 9h, a stepped section is formed larger than the length w. On the outer peripheral surface of the dam section 9g, a groove 9i is formed in an annular shape in the circumferential direction.

The outer-side end of the outer ring 2 is press-fitted into the dam section 9g. That is, the inner peripheral surface of the dam section 9g is in close contact with the outer peripheral surface of the outer ring 2 to prevent muddy water, dust, or the like from entering the bearing device for a vehicle wheel 1 from the outside. Further, the dam section 9g and the outer member-side eaves section 9h form a dam having a height t1 at the outer-side end of the outer ring 2. The outer member-side eaves section 9h is disposed to surround the outer ring 2 from the dam section 9g toward the inner side. Further, the outer member-side eaves section 9h is disposed away from the outer peripheral surface of the outer ring 2 by the length w. That is, the dam section 9g and the outer member-side eaves section 9h form an annular space S having a radial width w and an axial length h1, the annular space S surrounding the outer peripheral surface of the outer ring 2 and being opened toward the inner side. This allows the dam section 9g and the outer member-side eaves section 9h to take muddy water or the like flowing from the inner side on the outer peripheral surface of the outer ring 2 into the annular space S and prevents the muddy water or the like from entering the seal lip portion on the outer side from the dam section 9g.

In the bearing device for a vehicle wheel 1 structured as described above, the hub ring 3 and the inner ring 4 are rotatably supported by the outer ring 2 with the row of inner-side balls 5a and the row of outer-side balls 5b interposed between the hub ring 3 and the inner ring 4, and the outer ring 2. Further, in the bearing device for a vehicle wheel 1, the gap between the inner-side opening 2a of the outer ring 2 and the inner ring 4 is closed by the inner-side seal member 6, and the gap between the outer-side opening 2b of the outer ring 2 and the hub ring 3 is closed by the outer-side seal member 9. This allows the bearing device for a vehicle wheel 1 to prevent lubricating grease from leaking out of the bearing device for a vehicle wheel 1 and prevent rainwater, dust, or the like from entering the bearing device for a vehicle wheel 1 from the outside and to make the hub ring 3 and the inner ring 4 supported by the outer ring 2 rotate.

Next, a description will be given of roles of the dam section 9g and the outer member-side eaves section 9h of the outer-side seal member 9 with reference to FIGS. 4A and 4B.

Figure 4A:
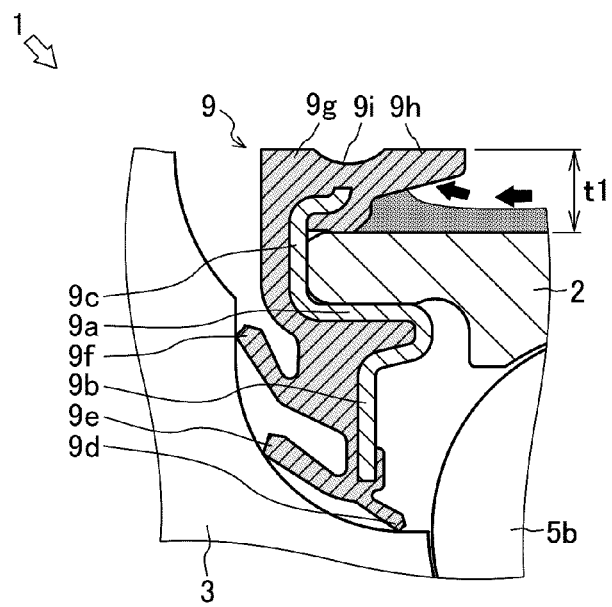
FIGS. 4A and 4B are partially enlarged cross-sectional views of the outer-side seal member in the first embodiment of the bearing device for a wheel.

As shown in FIG. 4A, when muddy water or the like (see the dark shaded portion) flows on the outer peripheral surface of the outer ring 2 from the inner side, the muddy water or the like flows into the annular space S formed by the dam section 9g and the outer member-side eaves section 9h. When the muddy water or the like flowing into the annular space S reaches a side surface of the dam section 9g, the muddy water or the like flows radially outward (see the black arrows).

Figure 5:
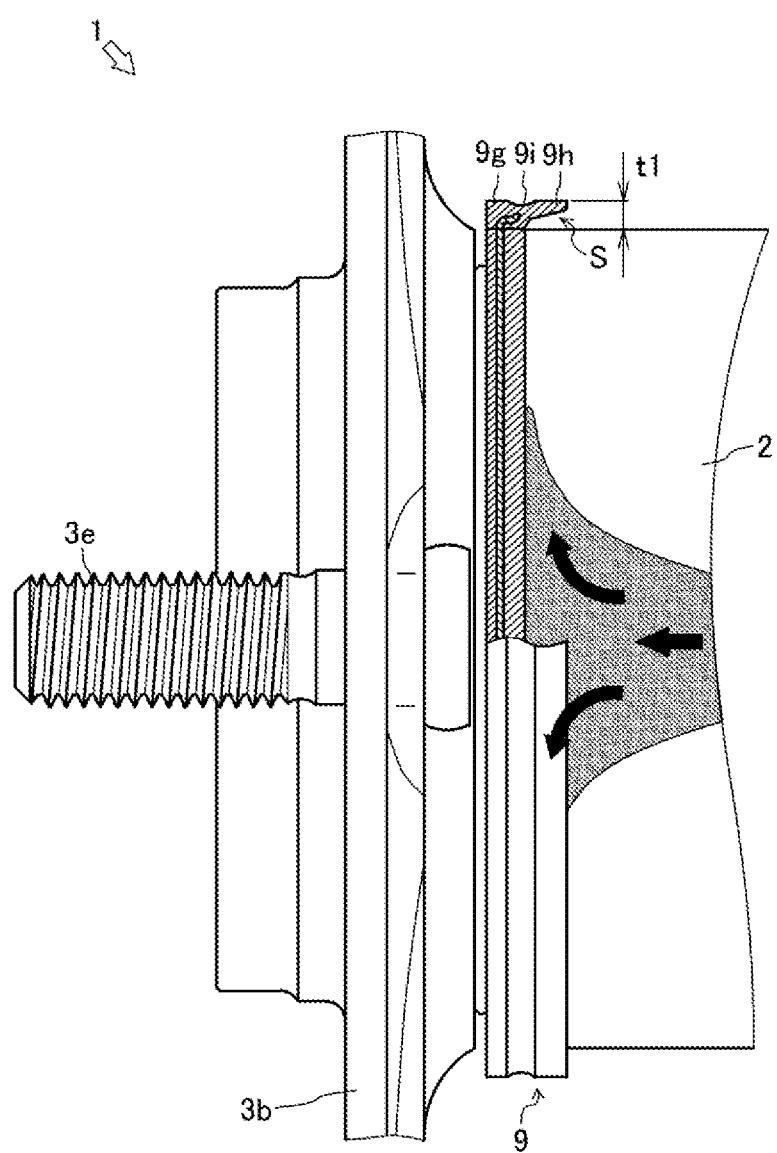
FIG. 5 is a partially enlarged view showing a state where muddy water or the like is flowing into the outer-side seal member in the first embodiment of the bearing device for a wheel according to the present invention.

As shown in FIG. 5, when the muddy water or the like flowing radially outward reaches the outer member-side eaves section 9h, the muddy water or the like flows along the inner peripheral surface of the outer member-side eaves section 9h and spreads in the annular space S. The muddy water or the like spreading in the annular space S overflows from the annular space S and flows out downward (see the dark shaded portion and the black arrows).

Figure 4B:
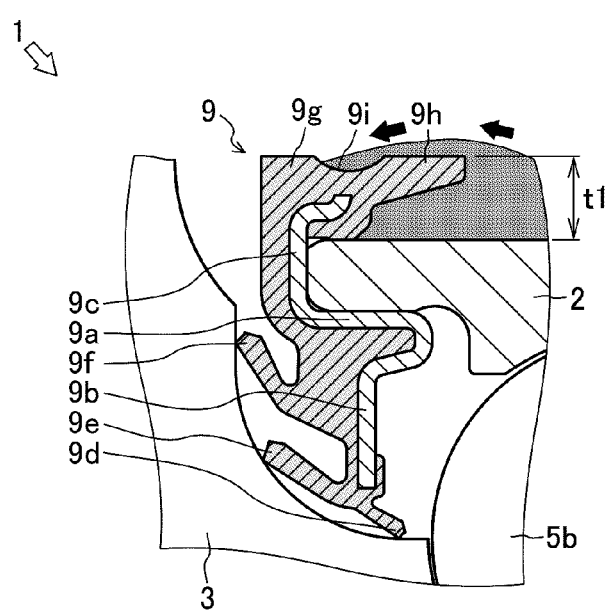

As shown in FIG. 4B, when the annular space S formed by the dam section 9g and the outer member-side eaves section 9h has been filled with muddy water or the like, muddy water or the like continuously flowing on the outer peripheral surface of the outer ring 2 from the inner side cannot flow into the annular space S, and climbs over the outer member-side eaves section 9h (see the dark shaded portion). The muddy water or the like that has climbed over the outer member-side eaves section 9h flows on the outer peripheral surface of the outer member-side eaves section 9h and reaches the groove 9i of the dam section 9g (see the black arrows). The muddy water or the like that has reached the groove 9i flows out downward by gravity.

As described above, in the bearing device for a vehicle wheel 1, the dam section 9g is provided with the outer member-side eaves section 9h to form the annular space S for receiving muddy water or the like along the outer peripheral surface of the outer ring 2. Since the dam section 9g and the outer member-side eaves section 9h are supported by the flange section 9c that is the core metal of the outer-side seal member 9, an elastic body constituting the annular space S can be made thinner. In other words, the annular space S has a large space for receiving muddy water or the like as compared with a structure where the dam section 9g is not supported by the core metal. The annular space S has any given size defined by the axial length h1 of the outer member-side eaves section 9h. In the bearing device for a vehicle wheel 1, since muddy water or the like is received by the whole of the annular space S, the amount of muddy water or the like required to climb over the dam section 9g increases. Further, in the bearing device for a vehicle wheel 1, muddy water or the like that has climbed over the dam section 9g flows out downward through the groove 9i. This allows, even when the height of the dam section 9g is limited, the bearing device for a vehicle wheel 1 to increase an effect of damming up muddy water or the like with the dam section 9g and the outer member-side eaves section 9h.

Next, a description will be given of a bearing device for a wheel 10 corresponding to a second embodiment of the bearing device for a wheel according to the present invention with reference to FIGS. 6A and 6B. Note that bearing devices for a wheel 102, 14, and 16 according to the following embodiments are each applied in place of the bearing device for a wheel 10 shown in FIGS. 1 to 5, and the names, figure numbers, and reference numerals used in the description given of the bearing device for a wheel 10 are used to denote the same components. That is, in the following embodiments, no detailed description will be given of the same points as the points of the embodiment already described, and a description will be mainly given of different points.

Figure 6A:
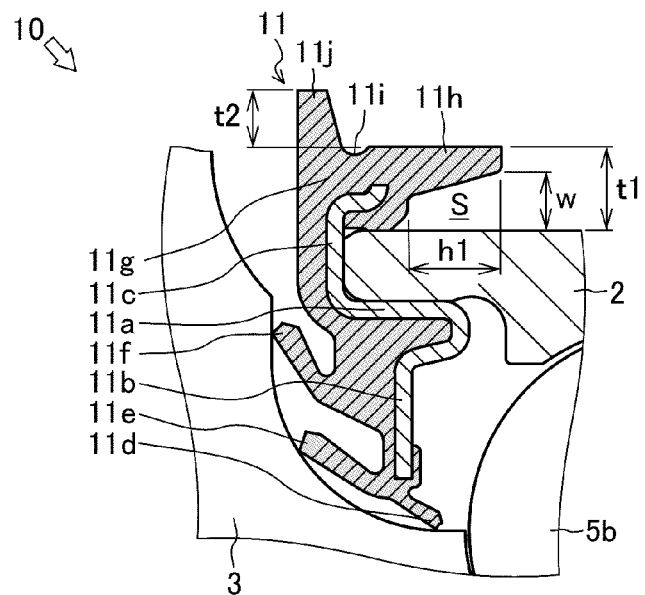
FIGS. 6A and 6B are partially enlarged cross-sectional views of an outer-side seal member in a second embodiment of the bearing device for a wheel.

As shown in FIG. 6A, an outer-side seal member 11 of the bearing device for a wheel 10 closes the gap between the outer-side opening 2b of the outer ring 2 and the hub ring 3. The outer-side seal member 11 is formed of a plurality of seal lips and a core metal that is provided with the seal lips and has an approximately cylindrical shape. On the core metal, a circular cylinder section 11a, a circular plate section 11b, and a flange section 11c are formed. A radial lip 11d, an inner axial lip 11e, and an outer axial lip 11f each formed in an annular shape are integrally provided on a plate surface of the circular plate section 11b of the core metal by, for example, vulcanization bonding. A dam section 11g, an outer member-side eaves section 11h, and a protruding section 11j each formed in an annular shape are integrally provided on an outer edge of the flange section 9c of the core metal by, for example, vulcanization bonding.

The protruding section 11j is formed in an annular shape on an outer-side outer peripheral surface of the dam section 11g. The protruding section 11j is formed with a radial length t2. In other words, the outer member-side eaves section 11h is formed on the inner-side side surface of the dam section 11g, and the protruding section 11j is formed on the outer-side outer peripheral surface of the dam section 11g. The inner-side outer peripheral surface of the dam section 11g and the outer peripheral surface of the outer member-side eaves section 11h form the same cylindrical surface. The outer-side outer peripheral surface of the dam section 11g protrudes radially outward as the protruding section 11j. That is, a dam having a height t2 is further formed on the outer side of the dam section 11g. On the inner-side outer peripheral surface of the dam section 11g, a groove 11i is formed in an annular shape in the circumferential direction.

The dam section 11g and the outer member-side eaves section 11h form a dam having a height t1 at the outer-side end of the outer ring 2. Furthermore, the dam section 11g and the protruding section 11j form a dam having the height t2 at the outer-side end of the outer ring 2. In other words, the dam section 11g and the protruding section 11j form the dam having the height t2 at a position on the outer side from the annular space S formed by the dam section 11g and the outer member-side eaves section 11h. This allows the dam section 11g and the protruding section 11j to dam up muddy water or the like that has overflowed from the annular space S and climbed over the outer member-side eaves section 11h to prevent the muddy water or the like from entering the seal lip portion located on the outer side from the protruding section 11j.

As described above, in the bearing device for a wheel 10, in addition to the dam having the height t1, the annular space S, and the groove 11i formed by the dam section 11g and the outer member-side eaves section 11h of the outer-side seal member 11, the dam having the height t2 is formed by the protruding section 11j along the outer peripheral surface of the dam section 11g.

Figure 6B:
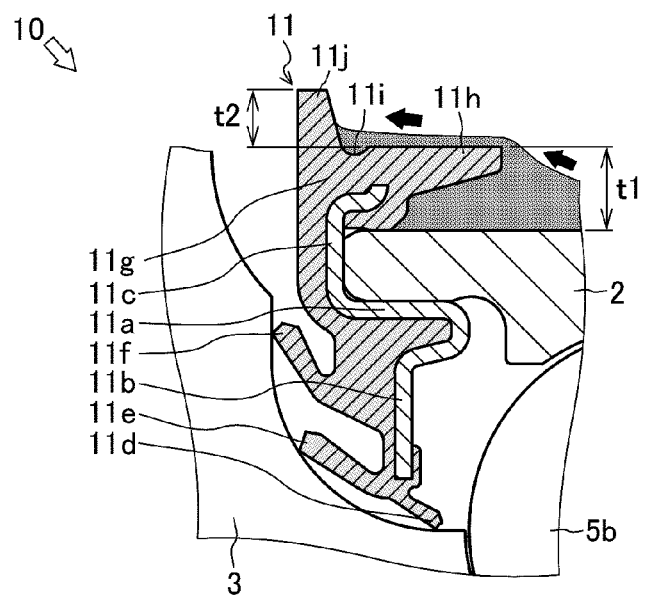

As shown in FIG. 6B, in the bearing device for a wheel 10, when muddy water or the like that has not flowed out through the groove 11i reaches the protruding section 11j (see the dark shaded portion and the black arrows), the muddy water or the like flows along a side surface of the protruding section 11j in the circumferential direction. That is, in the bearing device for a wheel 10, the muddy water or the like flows out downward along the protruding section 11j. This allows the bearing device for a wheel 10 to increase an effect of damming up muddy water or the like even when the volume of the muddy water or the like exceeds the volume of the annular space S formed by the dam section 11g and the outer member-side eaves section 11h.

Next, a description will be given of a bearing device for a wheel 12 corresponding to a third embodiment of the bearing device for a wheel 12 according to the present invention with reference to FIGS. 7A and 7B.

Figure 7A:
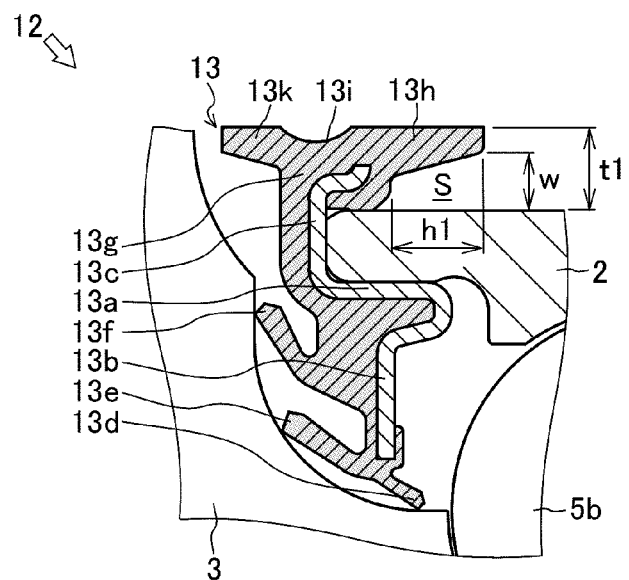
FIGS. 7A and 7B are partially enlarged cross-sectional views of an outer-side seal member in a third embodiment of the bearing device for a wheel.

As shown in FIG. 7A, an outer-side seal member 13 of the bearing device for a wheel 12 closes the gap between the outer-side opening 2b of the outer ring 2 and the hub ring 3. The outer-side seal member 13 is formed of a plurality of seal lips and a core metal that is provided with the seal lips and has an approximately cylindrical shape. On the core metal, a circular cylinder section 13a, a circular plate section 13b, and a flange section 13c are formed. A radial lip 13d, an inner axial lip 13e, and an outer axial lip 13f each formed in an annular shape are integrally provided on a plate surface of the circular plate section 13b of the core metal by, for example, vulcanization bonding. A dam section 13g, an outer member-side eaves section 13h, and an inner member-side eaves section 13k each formed in an annular shape are integrally provided on an outer edge of the flange section 13c of the core metal by, for example, vulcanization bonding.

The inner member-side eaves section 13k is formed in a cylindrical shape that protrudes in the axial direction from an outer-side side surface of the dam section 13g and has any given axial length h2 to the extent that the inner member-side eaves section 13k does not come into contact with the hub ring 3. The inner member-side eaves section 13k is formed identical in outer diameter to the dam section 13g. That is, the outer peripheral surface of the dam section 13g, the outer peripheral surface of the outer member-side eaves section 13h, and the outer peripheral surface of the inner member-side eaves section 13k form the same cylindrical surface. On the outer peripheral surface of the dam section 13g, a groove 13i is formed in an annular shape in the circumferential direction.

The dam section 13g and the outer member-side eaves section 13h form a dam having a height t1 at the outer end of the outer ring 2. The dam section 13g and the inner member-side eaves section 13k are arranged to cover the gap between the outer ring 2 and the hub ring 3. That is, the dam section 13g and the inner member-side eaves section 13k form a cover that covers the gap between the outer ring 2 and the hub ring 3. Furthermore, the inner member-side eaves section 13k can be brought close to the hub ring 3 to the extent that only a minute gap is left to form a labyrinth. This allows the dam section 13g and the inner member-side eaves section 13k to prevent, with an exclusion effect of the cover structure and a sealing effect of the labyrinth structure, muddy water or the like from entering the seal lip portion disposed between the outer ring 2 and the hub ring 3.

In the bearing device for a wheel 12, the gap between the outer ring 2 and the hub ring 3 is covered by not only the dam having the height t1, the annular space S, and the groove 13*i* formed by the dam section 13*g* and the outer member-side eaves section 13*h* of the outer-side seal member 13 but also the inner member-side eaves section 13*k*.

Figure 7B:
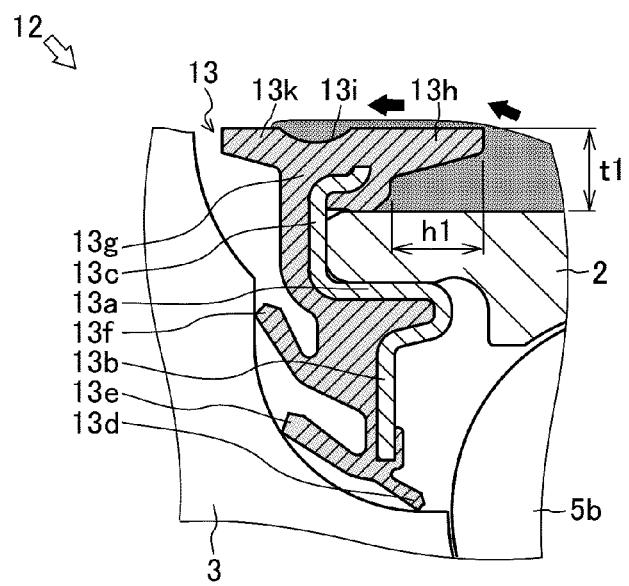

As shown in FIG. 7B, in the bearing device for a wheel 12, muddy water or the like that has not flowed out by the annular space S reaches the outer peripheral surface of the dam section 13*g* and flows out downward through the groove 13*i* and the inner member-side eaves section 13*k* (see the dark shaded portion and the black arrows). This allows the bearing device for a wheel 12 to increase an effect of damming up muddy water or the like even when the volume of the muddy water or the like exceeds the volume of the annular space S formed by the dam section 13*g* and the outer member-side eaves section 13*h*.

Next, a description will be given of a bearing device for a wheel 14 corresponding to a fourth embodiment of the bearing device for a wheel 14 according to the present invention with reference to FIGS. 8A and 8B.

Figure 8A:
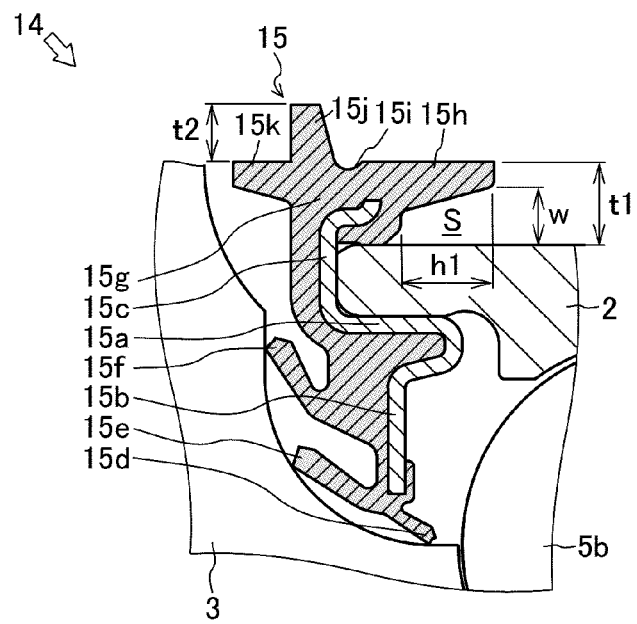
FIGS. 8A and 8B are partially enlarged cross-sectional views of an outer-side seal member in a fourth embodiment of the bearing device for a wheel.

As shown in FIG. 8A, an outer-side seal member 15 of the bearing device for a wheel 14 closes the gap between the outer-side opening 2*b* of the outer ring 2 and the hub ring 3. The outer-side seal member 15 is formed of a plurality of seal lips and a core metal that is provided with the seal lips and has an approximately cylindrical shape. On the core metal, a circular cylinder section 15*a*, a circular plate section 15*b*, and a flange section 15*c* are formed. A radial lip 15*d*, an inner axial lip 15*e*, and an outer axial lip 15*f* each formed in an annular shape are integrally provided on a plate surface of the circular plate section 15*b* of the core metal by, for example, vulcanization bonding. A dam section 15*g*, an outer member-side eaves section 15*h*, a protruding section 15*j*, and an inner member-side eaves section 15*k* each formed in an annular shape are integrally provided on an outer edge of the flange section 15*c* of the core metal by, for example, vulcanization bonding.

The outer member-side eaves section 15*h* is formed in a cylindrical shape that protrudes in the axial direction from an inner-side side surface of the dam section 15*g* and has any given axial length h1. The inner member-side eaves section 15*k* is formed in a cylindrical shape that protrudes in the axial direction from an outer-side side surface of the dam section 15*g* and has any given axial length h2 to the extent that the inner member-side eaves section 15*k* does not come into contact with the hub ring 3. The protruding section 15*j* is formed in an annular shape on an outer-side outer peripheral surface of the dam section 15*g*. The protruding section 15*j* is formed with a radial length t2. That is, the inner member-side eaves section 15*k* is formed in a cylindrical shape on the inner side of the dam section 15*g*, the outer member-side eaves section 15*h* is formed in a cylindrical shape on the outer side of the dam section 15*g*, and the protruding section 15*j* is formed in an annular shape on the outer peripheral surface of the dam section 15*g*. On the inner-side outer peripheral surface of the dam section 15*g*, a groove 15*i* is formed in an annular shape in the circumferential direction.

In the bearing device for a wheel 14, the dam section 15*g* and the outer member-side eaves section 15*h* form a dam having a height t1 at the outer-side end of the outer ring 2, and the dam section 15*g* and the inner member-side eaves section 15*k* are arranged to cover the gap between the outer ring 2 and the hub ring 3. Further, a dam having a height t2 is further formed on the outer side of the dam section 15*g*.

Figure 8B:
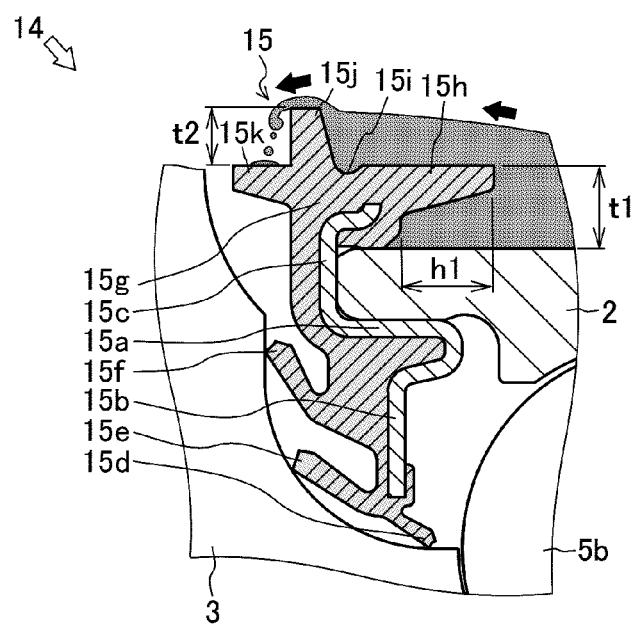

As shown in FIG. 8B, in the bearing device for a wheel 14, the dam section 15*g* and the protruding section 15*j* dam up muddy water or the like that has overflowed from the annular space and climbed over the outer member-side eaves section 15*h* (see the dark shaded portion and the black arrows). Furthermore, in the bearing device for a wheel 14, the dam section 15*g* and the inner member-side eaves section 15*k* prevent, with an exclusion effect of the cover structure that covers the gap between the outer ring 2 and the hub ring 3, muddy water or the like from entering the seal lip portion. Further, in the bearing device for a wheel 14, the dam section 15*g* and the inner member-side eaves section 15*k* prevent, with a sealing effect of the labyrinth structure where the hub ring 3 and the inner member-side eaves section 15*k* are brought close to each other, muddy water or the like from entering the seal lip portion. This allows the protruding section 15*j* and the inner member-side eaves section 15*k* of the bearing device for a wheel 14 to increase an effect of damming up muddy water or the like even when the volume of the muddy water or the like exceeds the volume of the annular space formed by the dam section 15*g* and the outer member-side eaves section 15*h*.

Note that, according to the above-described embodiments, the dam sections 9*g*, 11*g*, 13*g*, and 15*g* are provided on the flange sections 9*c*, 11*c*, 13*c*, and 15*c* of the core metal, respectively, but may be made of only a material such as a synthetic rubber that is an elastic member.

Figure 9:
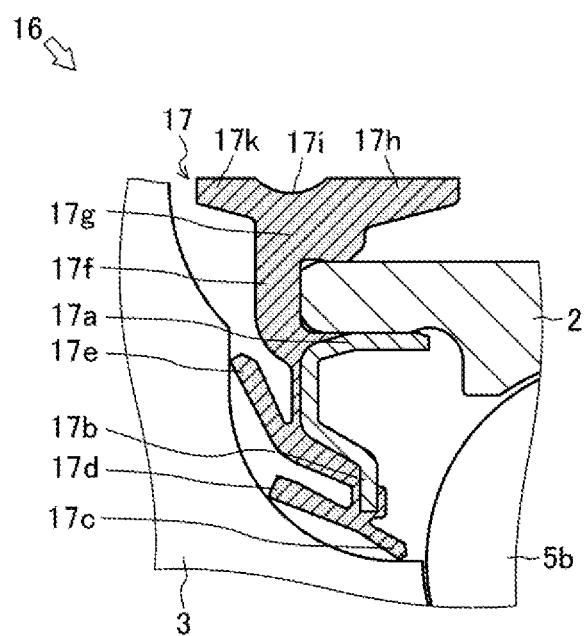
FIG. 9 is a partially enlarged cross-sectional view showing a structure of an outer-side seal member in a fifth embodiment of the bearing device for a wheel according to the present invention.

For example, as shown in FIG. 9, on a core metal of an outer-side seal member 17 of a bearing device for a wheel 16 of the fifth embodiment corresponding to a modification of the third embodiment, a circular cylinder section 17*a* and a circular plate section 17*b* are formed. A radial lip 17*c*, an inner axial lip 17*d*, and an outer axial lip 17*e* each formed in an annular shape are integrally provided on a plate surface of the circular plate section 17*b* of the core metal by, for example, vulcanization bonding. Furthermore, a dam section 17*g*, an outer member-side eaves section 17*h*, and an inner member-side eaves section 17*k* are integrally provided on the plate surface of the circular plate section 17*b* of the core metal by, for example, vulcanization bonding with a support section 17*f* that is an elastic body formed in an annular shape between the plate surface of the circular plate section 17*b*, and the dam section 17*g*, the outer member-side eaves section 17*h*, and the inner member-side eaves section 17*k*. As described above, in the bearing device for a wheel 16, the dam section 17*g*, the outer member-side eaves section 17*h*, and the inner member-side eaves section 17*k* are formed of only an elastic body, which makes it possible to increase workability when the outer-side seal member 17 is fitted onto the outer ring 2.

Figure 10A:
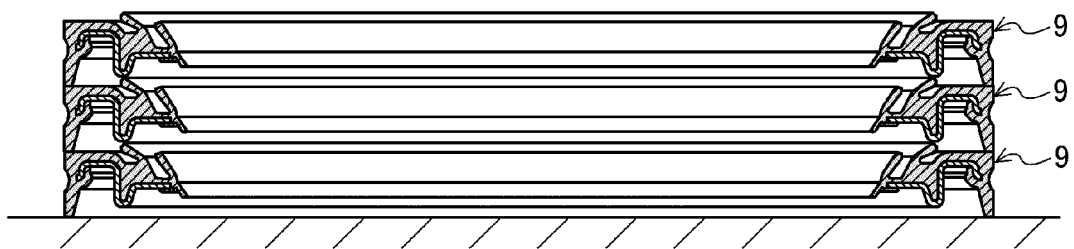
FIGS. 10A and 10B are cross-sectional views of the outer-side seal members in the first embodiment of the bearing device for a wheel.

Further, as shown in FIG. 10A, in an assembly process of the bearing device for a vehicle wheel 1, when the outer-side seal member 9 is assembled to the outer ring 2 of the bearing device for a vehicle wheel 1, an assembling preparation is made with the outer-side seal members 9 stacked on a worktable or the like. The outer-side seal members 9 are stacked on each other with their respective outer member-side eaves sections 9*h* facing downward.

Figure 10B:
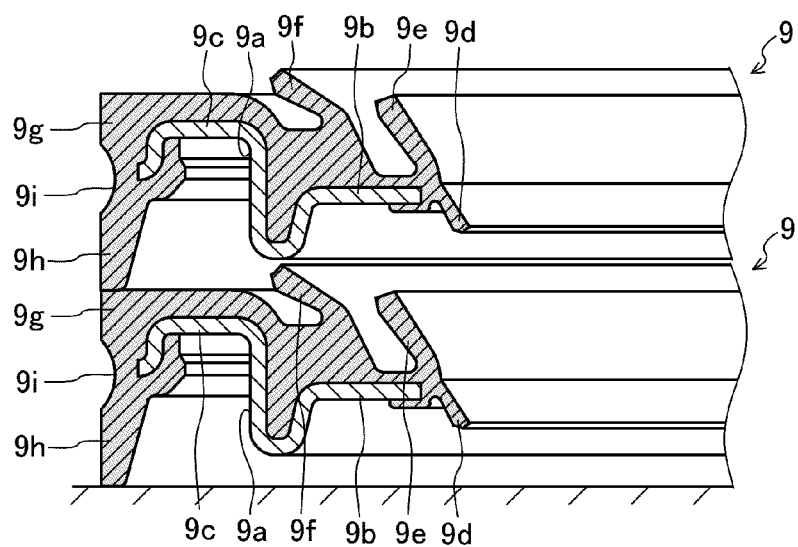

As shown in FIG. 10B, a first-level outer-side seal member 9 is disposed with only the tip of the outer member-side eaves section 9*h* in contact with the worktable or the like. A second-level outer-side seal member 9 is disposed with only the tip of the outer-member-side eaves section 9*h* in contact with the dam section 9*g* of the lower (first-level) outer-side seal member 9. At this time, the radial lip 9*d*, the inner axial lip 9e, and the outer axial lip 9f of the lower outer-side seal member 9 do not come into contact with the upper (second-level) outer-side seal member 9. Similarly, the outer-side seal members 9 are stacked on each other such that only the tip of the outer member-side eaves section 9h is in contact with the dam section 9g of the lower outer-side seal member 9.

With such a structure, when the outer-side seal members 9 of the bearing device for a vehicle wheel 1 are stacked in the assembly process, the outer member-side eaves section 9h of the upper outer-side seal member 9 and the dam section 9g of the lower outer-side seal member 9 are in contact with each other, thereby preventing the inner axial lip 9e and the outer axial lip 9f from coming into contact with the upper outer-side seal member 9. This in turn prevents grease applied in advance to the inner axial lip 9e and the outer axial lip 9f of the lower outer-side seal member 9 from adhering to the upper outer-side seal member 9. That is, the outer-side seal member 9 is assembled to the bearing device for a vehicle wheel 1 in a state where a necessary amount of grease for sliding is held on the lip portion. This further allows the outer-side seal member 9 to be smoothly assembled while suppressing damage to the lip portion in the assembly process.

According to the embodiment described above, the outer-side seal member 9 is formed of the radial lip 9d, the inner axial lip 9e, and the outer axial lip 9f, but may be a seal member having a different structure. Further, the outer-side seal member 9 is bonded by vulcanization to the circular cylinder section 9a, the circular plate section 9b, and the flange section 9c of the core metal, but a different bonding method may be used. The same applies to the outer-side seal members 11, 13, 15, and 17.

In addition, the bearing devices for a wheel 1, 10, 12, 14, and 16 described herein each have a third generation structure of an inner ring rotating type that is formed of a fitted body including the hub ring 3 that is the inner member having one inner ring 4 fitted thereon and the outer ring 2 that is the outer member having an installation flange, but are not limited to such a structure. A first generation structure formed of the outer ring 2 that is the outer member and a pair of the inner rings 4 that is the inner member, or a second generation structure of an inner ring rotating type formed of the outer ring 2 that is the outer member having the installation flange and a pair of the inner rings 4 that is the inner member fitted on the outer periphery of the hub ring 3 is applicable. Further, a fourth generation structure formed of a fitted body including the hub ring 3 that is the inner member coupled with a universal joint, and the outer ring 2 that is the outer member having the installation flange is applicable.

Although descriptions have been given above of the embodiments of the present invention, the present invention is in no way limited to the embodiments, and the embodiments are merely examples. It is needless to say that various other embodiments can be made without departing from the scope of the present invention, and the scope of the present invention is set forth in the claims and further contains meaning of equivalents set forth in the claims and all modifications within the scope.

The present invention is applicable to a bearing device for a wheel.

The invention claimed is:

1. A bearing device for a wheel, the bearing device comprising:
    an outer member having double-row outer rolling surfaces integrally formed on an inner periphery;
    an inner member including a hub ring having a stepped section axially extending on an outer periphery and at least one inner ring press-fitted on the stepped section of the hub ring, the inner member having double-row inner rolling surfaces formed on an outer periphery facing the double-row outer rolling surfaces;
    double-row rolling elements rollably interposed between respective races of the outer member and the inner member; and
    a seal member configured to seal a space between the outer member and the inner member,
    wherein:
    the seal member includes a core metal having a circular cylinder section provided in an opening of the outer member and a circular plate section extending radially inward from the circular cylinder section, and a lip formed of an elastic body provided on the circular plate section;
    a dam section formed of an elastic body and having an annular shape extends from the core metal, the dam section protruding radially outward relative to an outer peripheral surface of the outer member, and an outer member-side eaves section formed of an elastic body and having a cylindrical shape being provided integrally with the dam section, the outer member-side eaves section axially protruding so as to surround the outer member;
    the core metal includes a flange section extending from the circular cylinder section radially outward relative to the outer peripheral surface of the outer member, and the dam section is provided on the flange section; and
    a radial distance between a radially innermost surface of a distal end of the outer member-side eaves section and the outer peripheral surface of the outer member is longer than a radial distance between a radially outermost end of the core metal and the outer peripheral surface of the outer member.

2. The bearing device according to claim 1, wherein an outer peripheral surface of the dam section protrudes radially outward relative to an outer peripheral surface of the outer member-side eaves section.

3. The bearing device according to claim 1, wherein an inner member-side eaves section having a cylindrical shape axially protrudes from the dam section toward the hub ring.

4. The bearing device according to claim 3, wherein an annular groove is circumferentially formed on an outer peripheral surface of at least one of the dam section, the outer member-side eaves section, and the inner member-side eaves section.

\* \* \* \* \*